United States Patent
Lee et al.

(10) Patent No.: US 7,468,775 B2
(45) Date of Patent: Dec. 23, 2008

(54) IN-PLANE SWITCHING MODE LIQUID CRYSTAL DISPLAY DEVICE AND METHOD FOR MANUFACTURING THE SAME

(75) Inventors: Chang Hoon Lee, Kyongsangbuk-do (KR); Byung Mun Ji, Taegu-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 8 days.

(21) Appl. No.: 10/742,919

(22) Filed: Dec. 23, 2003

(65) Prior Publication Data
US 2004/0135953 A1    Jul. 15, 2004

(30) Foreign Application Priority Data
Dec. 30, 2002    (KR)    ............ 10-2002-0087118

(51) Int. Cl.
 *G02F 1/1339*    (2006.01)
(52) U.S. Cl. .............. 349/153; 349/110; 349/141; 349/190
(58) Field of Classification Search .......... 349/110, 349/111, 141, 153, 156, 190; 430/20, 321, 430/5, 6, 7
See application file for complete search history.

(56) References Cited

U.S. PATENT DOCUMENTS

2003/0081155 A1*    5/2003    Moon et al. .............. 349/106

FOREIGN PATENT DOCUMENTS

JP    2000-352717    12/2000

* cited by examiner

*Primary Examiner*—Dung Nguyen
*Assistant Examiner*—Tai Duong
(74) *Attorney, Agent, or Firm*—McKenna Long & Aldridge LLP

(57) ABSTRACT

An IPS mode LCD device and a method for manufacturing the same is disclosed in which a UV-hardening sealant is used to prevent a liquid crystal from being contaminated and improve efficiency in hardening the sealant. The IPS mode LCD device includes first and second substrates being opposite to each other, each substrate having an active region and a dummy region; a black matrix layer in the dummy region of the second substrate; a UV-hardening sealant at the circumference of the black matrix layer between the first and second substrates to bond the first and second substrates to each other; a metal pattern between the UV-hardening sealant and the first substrate; and a liquid crystal layer between the first and second substrates bonded by the UV-hardening sealant.

9 Claims, 8 Drawing Sheets

IN-PLANE SWITCHING MODE LIQUID CRYSTAL DISPLAY DEVICE AND METHOD FOR MANUFACTURING THE SAME

This application claims the benefit of the Korean Application No. P2002-87118 filed on Dec. 30, 2002, which is hereby incorporated by reference.

BACKGROUND OF THE INVENTION

1. Field of the Invention

The present invention relates to an in-plane switching mode liquid crystal display (LCD) device. More particularly, the present invention relates to an in-plane switching IPS mode LCD device and a method for manufacturing the same for improving efficiency in hardening a sealant by photo (UV).

2. Discussion of the Related Art

Demands for various display devices have increased with development of an information society. Accordingly, many efforts have been made to research and develop various flat display devices such as liquid crystal display (LCD), plasma display panel (PDP), electroluminescent display (ELD), and vacuum fluorescent display (VFD). Some species of flat display devices have already been applied to displays of various equipment.

Among the various flat display devices, liquid crystal display (LCD) devices have been most widely used due to advantageous characteristics of thinness, low weight, and low power consumption, whereby the LCD devices provide a substitute for a Cathode Ray Tube (CRT). In addition to mobile type LCD devices such as a display for a notebook computer, LCD devices have been developed for computer monitors and televisions to receive and display broadcasting signals.

Despite various technical developments in the LCD technology having applications in different fields, research in enhancing the picture quality of the LCD device has been, in some respects, lacking as compared to other features and advantages of the LCD device. In order to use LCD devices in various fields as a general display, the key to developing LCD devices depends on whether LCD devices can implement a high quality picture, such as high resolution and high luminance with a large-sized screen, while still maintaining low weight, thinness, and low power consumption.

A LCD device includes an LCD panel for displaying a picture image, and a driving part for applying a driving signal to the LCD panel. The LCD panel includes first and second glass substrates that are bonded to each other at a predetermined interval, and a liquid crystal layer injected between the first and second glass substrates.

The first glass substrate (a TFT array substrate) includes a plurality of gate and data lines, a plurality of pixel electrodes, and a plurality of thin film transistors. At this time, the plurality of gate lines are formed on the first glass substrate at fixed intervals in one direction, and the plurality of data lines are formed at fixed intervals perpendicular to the plurality of gate lines. Then, the plurality of pixel electrodes of a matrix arrangement are respectively formed in pixel regions defined by the plurality of gate and data lines crossing each other. The plurality of thin film transistors are switched according to signals of the gate lines for transmitting signals of the data lines to the respective pixel electrodes.

The second glass substrate (a color filter substrate) includes a black matrix layer that excludes light from regions except the pixel regions of the first substrate, R/G/B color filter layer displaying various colors, and a common electrode to obtain the picture image. In the case of an IPS mode LCD device, the common electrode is formed on the first glass substrate.

Next, a predetermined space is maintained between the first and second glass substrates by spacers, and the first and second substrates are bonded to each other by a sealant pattern having a liquid crystal injection inlet. At this time, the liquid crystal layer is formed according to a liquid crystal injection method, in which the liquid crystal injection inlet is dipped into a container having liquid crystal while maintaining a vacuum state in the predetermined space between the first and second glass substrates. That is, the liquid crystal is injected between the first and second substrates by an osmotic action. Then, the liquid crystal injection inlet is sealed with the sealant.

The LCD device is driven according to optical anisotropy and polarizability of liquid crystal. Liquid crystal molecules are aligned using directional characteristics because the liquid crystal molecules have long and thin shapes. In this respect, an electric field is applied to the liquid crystal for controlling the alignment direction of the liquid crystal molecules. That is, if the alignment direction of the liquid crystal molecules is controlled by the electric field, the light is polarized and changed by the optical anisotropy of the liquid crystal, thereby displaying the picture image.

The liquid crystal is classified into positive (+) type liquid crystal having positive dielectric anisotropy and negative (−) type liquid crystal having negative dielectric anisotropy according to electrical characteristics of the liquid crystal. In the positive (+) type liquid crystal, a longitudinal axis of a positive (+) liquid crystal molecule is in parallel to the electric field applied to the liquid crystal. Meanwhile, in the negative (−) type liquid crystal, a longitudinal axis of a negative (−) liquid crystal molecule is perpendicular to the electric field applied to the liquid crystal.

FIG. 1 is an exploded perspective view illustrating some parts of a general twisted nematic (TN) mode LCD device. As shown in FIG. 1, the general TN mode LCD device includes lower and upper substrates 1 and 2 bonded to each other at a predetermined interval, and a liquid crystal layer 3 injected between the lower and upper substrates 1 and 2.

More specifically, the lower substrate 1 includes a plurality of gate lines 4, a plurality of data lines 5, a plurality of pixel electrodes 6, and a plurality of thin film transistors T. The plurality of gate lines 4 are formed on the lower substrate 1 in one direction at fixed intervals, and then the plurality of data lines 5 are formed perpendicular to the plurality of gate lines 4 at fixed intervals, thereby defining a plurality of pixel regions P. Subsequently, the plurality of pixel electrodes 6 are respectively formed in the pixel regions P defined by the plurality of gate and data lines 4 and 5 crossing each other, and the plurality of thin film transistors T are respectively formed at crossing points of the plurality of gate and data lines 4 and 5. Also, the upper substrate 2 includes a black matrix layer 7 that excludes light from regions except the pixel regions P, R/G/B color filter layer 8 for displaying various colors, and a common electrode 9 for displaying a picture image.

The common electrode 9 is formed on the upper substrate 2, so that a common line is formed in a dummy region of the lower substrate 1 in order to apply a common voltage to the common electrode 9, and Ag dots are formed between the upper and lower substrates for electrically connecting the common line and the common electrode 9 to each other. The aforementioned structure will be described in detail. FIG. 2 is a plan view illustrating a general TN mode LCD device, and FIG. 3 is a cross-sectional view taken along line I-I' of FIG. 2.

As mentioned above, FIG. 2 is a layout of lower and upper substrates 1 and 2 bonded to each other at a predetermined interval. The respective lower and upper substrates 1 and 2 have active and dummy regions. In the active region of the lower substrate 1, as shown in FIG. 1, there are the gate line 4, the data line 5, the pixel electrode 6 and the thin film transistor T. Meanwhile, as shown in FIG. 2, the dummy region of the lower substrate 1 includes the common line 100 for applying the common voltage to the common electrode 9 of the upper substrate 2, and outgoing lines 103 and 104 respectively connecting the gate and data lines 4 and 5 to gate and data driving ICs 101 and 102. Also, as shown in FIG. 1, the active region of the upper substrate 2 includes the black matrix layer 7, the R/G/B color filter layer 8 and the common electrode 9, and the dummy region of the upper substrate 2 includes the black matrix layer (106 of FIG. 3).

After that, a sealant 105 is formed in the dummy region between the upper and lower substrates 1 and 2, thereby bonding the upper and lower substrates 1 and 2 to each other. Then, the liquid crystal layer 3 is formed between the upper and lower substrates 1 and 2. At this time, unexplained reference numbers 107 and 108 are alignment layers, and an unexplained reference number 109 is a spacer. In this case, the sealant 105 is a heat-hardening sealant, and a pattern of the sealant 105 has a liquid crystal injection inlet. Accordingly, after bonding the upper and lower substrates, the sealant is hardened in Hot Press, and the liquid crystal is injected into a space between the upper and lower substrates through the liquid crystal injection inlet in a vacuum chamber.

In the aforementioned TN mode LCD device, the liquid crystal layer 3 positioned on the pixel electrode 6 is aligned according to a signal applied from the thin film transistor T, and light transmittance transmitting the liquid crystal layer 3 is controlled by the alignment of the liquid crystal layer 3, thereby displaying the picture image. Also, in the aforementioned LCD device, liquid crystal molecules are driven according to an electric field formed at upper and lower sides between the common electrode 9 and the pixel electrode 6, to be perpendicular to the substrates, thereby obtaining great transmissivity and high aperture ratio. Also, the common electrode 9 of the upper substrate 2 serves as a ground, whereby it is possible to prevent liquid crystal cells from being damaged by static electricity. However, it is not advantageous because it is hard to obtain a wide viewing angle.

In order to solve this problem, an IPS mode LCD device is proposed. FIG. 4 is a plan view illustrating an IPS mode LCD device according to the related art, and FIG. 5 is a cross-sectional view taken along line II-II' of FIG. 4.

As shown in FIG. 4 and FIG. 5, a plurality of gate lines 22 are arranged at fixed intervals in one direction on an active region of a transparent lower substrate 21, and a plurality of data lines 25 are formed perpendicular to the gate lines 22 at fixed intervals, thereby defining a plurality of pixel regions P. Then, a common line 29 is formed in the pixel region P in parallel to the gate line 22, and a thin film transistor T is formed in each pixel region P defined at the crossing of the gate and data lines 22 and 25. The thin film transistor T includes a gate electrode 22a projecting from the gate line 22, a gate insulating layer on an entire surface of the transparent lower substrate 21, an active layer 24 on the gate insulating layer 23 above the gate electrode 22a, a source electrode 25a projecting from the data line 25, and a drain electrode 25b at a fixed interval from the source electrode 25a.

In the respective pixel regions P, a plurality of pixel electrodes 28 are formed parallel to the respective data lines 25 at fixed intervals from the respective data lines 25. One end of the pixel electrode 28 is connected to the drain electrode 25b of the thin film transistor T. Also, in the pixel region P, a plurality of common electrodes 29a are projected from the common line 29. The pixel electrode 28 is formed parallel to the common electrode 29a. After that, a passivation layer 26 is formed on the entire surface of the transparent lower substrate 21. At this time, the passivation layer 26 is formed of SiNx or SiOx. Then, an alignment layer (not shown) is formed of polyimide on the passivation layer 26.

Meanwhile, a transparent upper substrate 31 is formed to being opposite to the transparent lower substrate 21. The transparent upper substrate 31 includes a black matrix layer 32 for preventing light leakage, R/G/B color filter layer 33 for displaying various colors, and an overcoat layer 34. Then, a liquid crystal layer 35 is formed between the transparent lower and upper substrates 21 and 31. Next, a plurality of spacers 36 having a predetermined size are formed between the transparent lower and upper substrates 21 and 31 to maintain a fixed interval therebetween. As mentioned above, the IPS mode LCD device forms the common electrode 29a and the common line 29 on the active region of the transparent lower substrate 21. In this respect, the IPS mode LCD device is different from the TN mode LCD device in that the common line is not formed in the dummy region of the transparent lower substrate 21.

FIG. 6 is a cross-sectional view illustrating a sealant pattern in the dummy region of the IPS mode LCD device according to the related art. As shown in FIG. 6, a sealant 30 is formed in the dummy region between the transparent lower and upper substrates 21 and 31, thereby bonding the transparent lower and upper substrates 21 and 31 to each other. At this time, the common line is not formed in the dummy region of the transparent lower substrate 21 having the sealant 30 thereon. Also, the black matrix layer 32 is formed in the dummy region of the transparent upper substrate 31., Herein, unexplained reference numbers are the overcoat layer 34 and the liquid crystal layer 35. The sealant 30 is a heat-hardening sealant, and a pattern of the sealant 30 has a liquid crystal injection inlet. In general, the heat-hardening sealant is formed of epoxy resin, urethane resin or phenol resin. Especially, the epoxy resin is most generally used for the heat-hardening sealant.

In the case of using the epoxy resin for the heat-hardening sealant, an epoxy ring is opened by a hardener such as amine or amide, and then the epoxy ring is reactive on another epoxy ring, whereby the epoxy rings are sequentially opened, thereby forming a high molecular chain. This process is referred to as hardening. The epoxy resin is classified into a normal temperature hardening type and a heat-hardening type. The normal temperature hardening type epoxy resin is hardened at a normal temperature, and the heat-hardening epoxy resin is hardened by performing a heat process between 120° C. and 140° C. for 30 minutes to 1 hour. For completing this process, the heating process is generally performed. That is, the two substrates are completely bonded to each other by the hardened epoxy resin. The hardened epoxy resin has great supporting characteristics, and hardness. Accordingly, after bonding the two substrates, the heat-hardening sealant is hardened in Hot Press, and the liquid crystal is injected between the two substrates through the liquid crystal injection inlet in a vacuum chamber.

However, the method for manufacturing the LCD device, in which the liquid crystal is injected between the two substrates after bonding the two substrates with the heat-hardening sealant, has the following disadvantages.

Accordingly, as a size of an LCD panel increases, much time is spent injecting the liquid crystal between the two substrates, and may generate failures in injecting the liquid crystal completely.

Since the heat-hardening sealant is used for the sealant, it generates thermal expansion. Also, when hardening the sealant, the sealant may leak out, thereby contaminating the liquid crystal, and generating spots on the LCD panel. That is, the heat process is performed at 250° C. between 2 and 3 hours to completely harden the epoxy resin of the heat-hardening sealant. Thus, before hardening the epoxy resin completely, the liquid crystal may flow into the active region, whereby the liquid crystal may be contaminated, and the spots may be generated on the LCD panel.

SUMMARY OF THE INVENTION

Accordingly, the present invention is directed to an in-plane switching (IPS) mode LCD device and a method for manufacturing the same that substantially obviates one or more problems due to limitations and disadvantages of the related art.

An advantage of the present invention is to provide an in-plane switching (IPS) mode LCD device and a method for manufacturing the same, in which a UV-hardening (UV and thermo hardening type) sealant is used, thereby preventing a liquid crystal from being contaminated, and improving efficiency in hardening the sealant.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve this and other advantages and in accordance with the purpose of the invention, as embodied and broadly described herein, an IPS mode LCD device includes first and second substrates opposite to each other, each substrate having an active region and a dummy region; a black matrix layer in the dummy region of the second substrate; a UV-hardening sealant at the circumference of the black matrix layer between the first and second substrates, to bond the first and second substrates together; a metal pattern between the UV-hardening sealant and the first substrate; and a liquid crystal layer between the first and second substrates bonded by the UV-hardening sealant.

Also, a method for manufacturing an IPS mode LCD device includes forming a metal pattern in a dummy region of a first substrate having active and dummy regions; forming a black matrix layer in a dummy region of a second substrate having active and dummy regions; depositing a UV-hardening sealant at the circumference of the black matrix layer on the second substrate; bonding the first and second substrates to each other after facing the UV-hardening sealant to the first substrate; and irradiating a UV ray to harden the UV-hardening sealant.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

An IPS mode LCD device and a method for manufacturing the same according to the present invention will be described with reference to the accompanying drawings.

Figure 1:
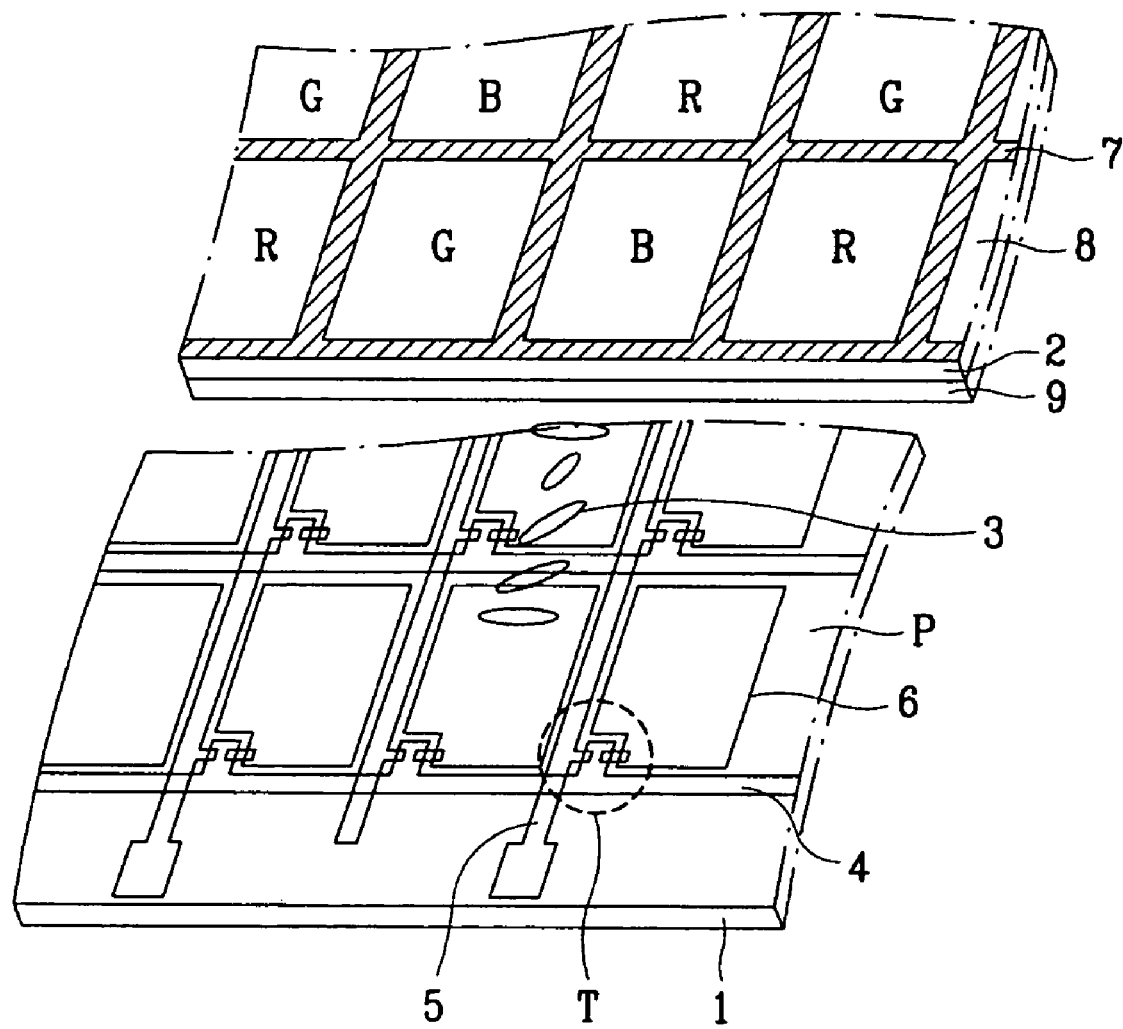
FIG. 1 is an exploded perspective view illustrating parts of a general TN mode LCD device.
Figure 2:
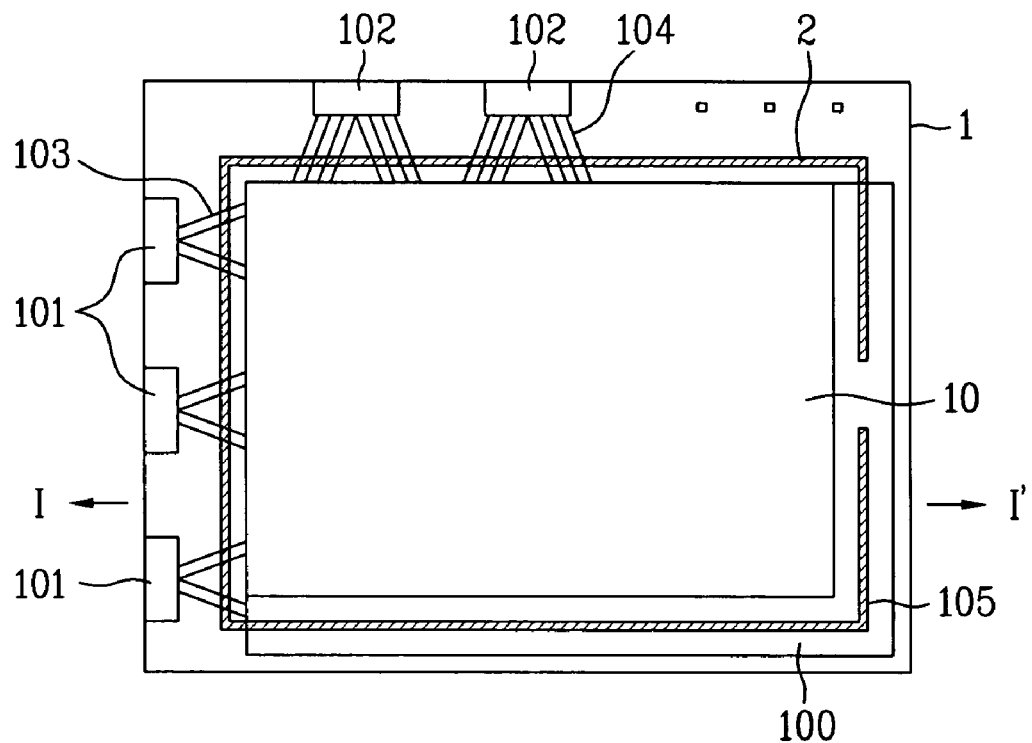
FIG. 2 is a layout illustrating a general TN mode LCD device.
Figure 3:
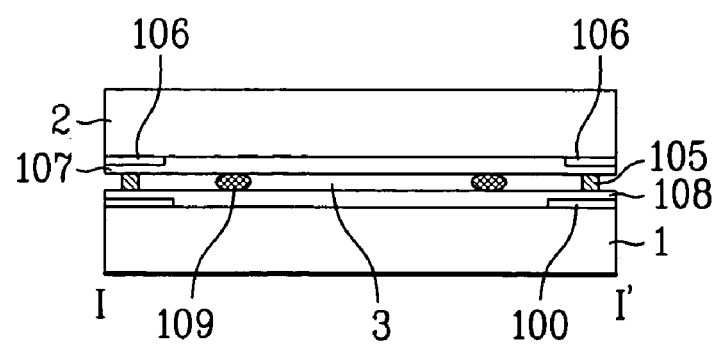
FIG. 3 is a cross-sectional view taken along line I-I' of FIG. 2.
Figure 4:
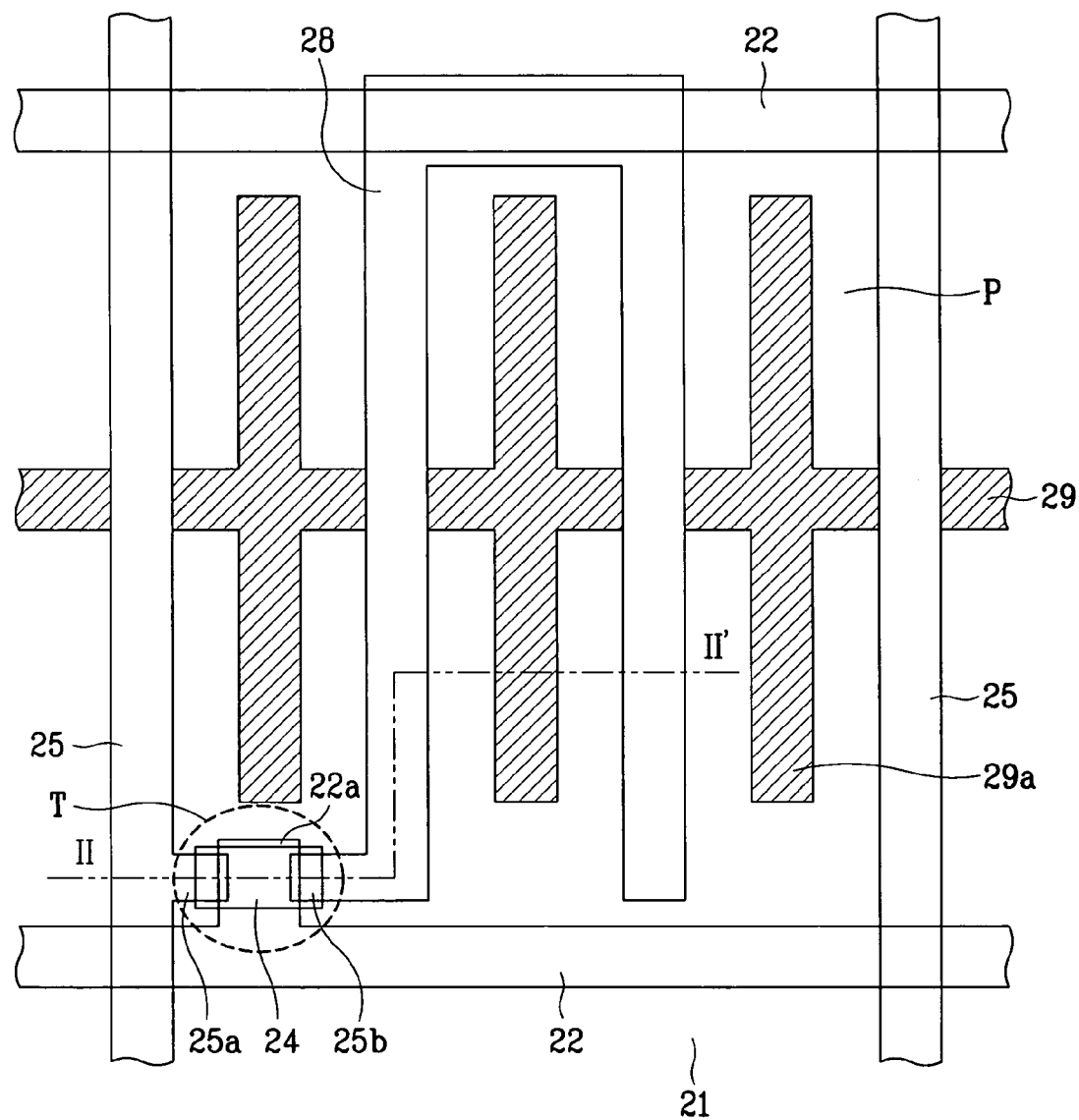
FIG. 4 is a plan view illustrating a related art IPS mode LCD device.
Figure 5:
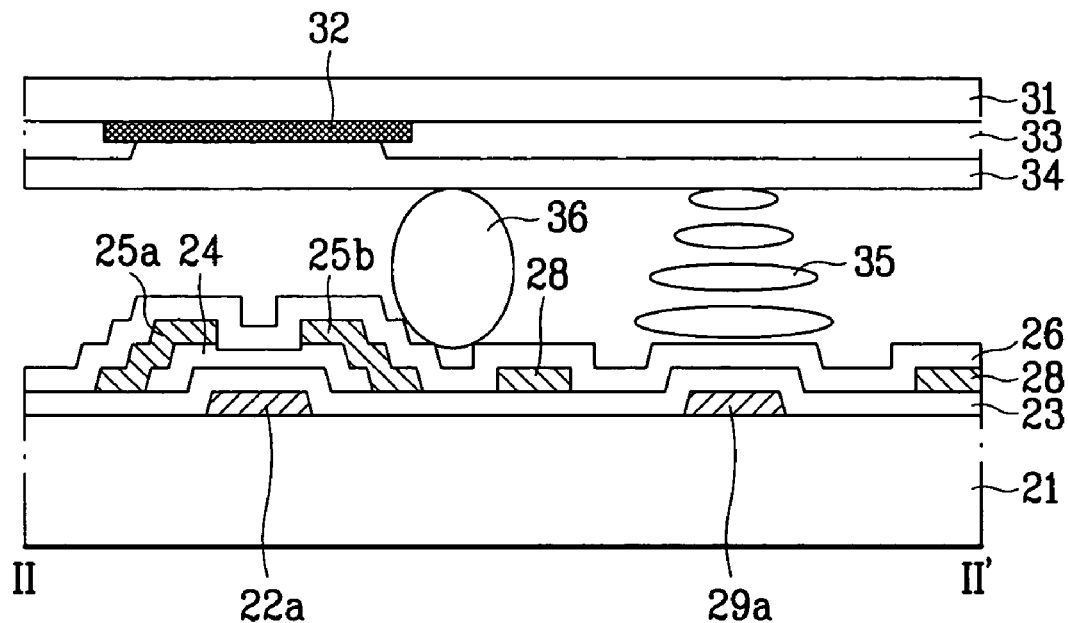
FIG. 5 is a cross-sectional view taken along line II-II' of FIG. 4.
Figure 6:
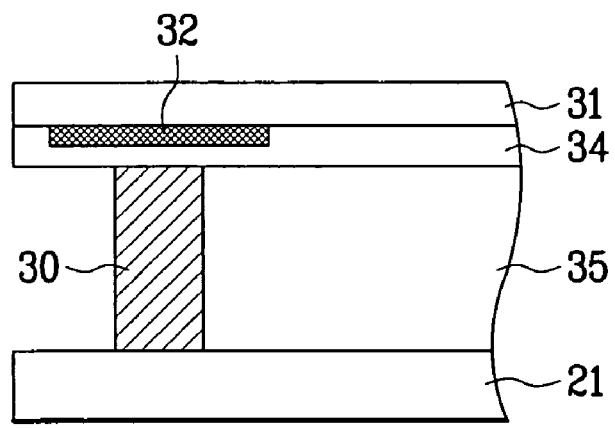
FIG. 6 is a cross-sectional view illustrating a sealant pattern in a dummy region of an IPS mode LCD device according to the related art.
Figure 7:
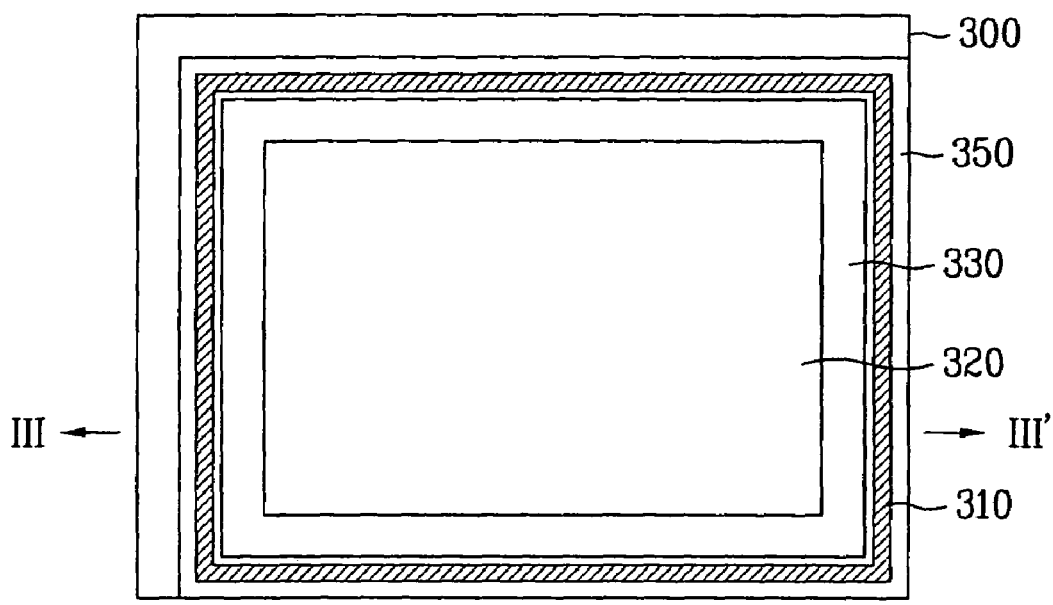
FIG. 7 is a layout illustrating an IPS mode LCD device using a UV-hardening sealant according to the first embodiment of the present invention.
Figure 8:
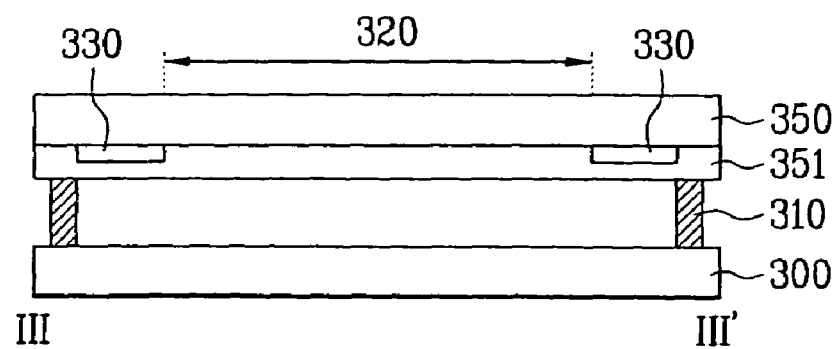
FIG. 8 is a cross-sectional view illustrating an IPS mode LCD device taken along line III-III' of FIG. 7 using a UV-hardening sealant according to the first embodiment of the present invention.

FIG. 7 is a layout illustrating an IPS mode LCD device using a UV-hardening sealant according to the first embodiment of the present invention. FIG. 8 is a cross-sectional view illustrating an IPS mode LCD device taken along line III-III' of FIG. 7 using a UV-hardening sealant according to the first embodiment of the present invention.

Referring to FIG. 7, the IPS mode LCD device using the UV-hardening sealant according to the first embodiment of the present invention includes first and second substrates 300 and 350. The first substrate 300 has a thin film transistor array of an IPS mode (TFT array, not shown) in an active region 320 thereof, and the second substrate 350 has a color filter array (C/F array, not shown) in the active region 320, and a black matrix layer 330 in a dummy region at the circumference of the active region 320. The first and second substrates 300 and 350 are bonded to each other by UV-hardening (UV and thermo hardening) sealant 310.

The UV-hardening sealant 310 is formed at the circumference of the black matrix layer 330 that is formed at the circumference of the active region 320, so that the black matrix layer 330 is not corresponding to the UV-hardening sealant 310. That is, it is possible to irradiate UV rays to the UV-hardening sealant 310. Also, column spacers (not shown) or fixing spacers may be formed on any one of the first and second substrates for maintaining a cell gap between the first and second substrates. In FIG. 8, reference numbers for an overcoat layer 351, and a liquid crystal layer 340 are provided.

At this time, the UV-hardening sealant 310 is formed of a resin material having one of acrylate groups such as epoxy acrylate resin, urethane acrylate resin and polyester acrylate. When the epoxy acrylate is hardened, the epoxy acrylate becomes hard. Meanwhile, when the urethane acrylate is hardened, the urethane acrylate becomes soft. The aforementioned UV-hardening sealant is reactive on a UV-hardener, and is formed as high polymer. That is, the UV hardener generates activated radical when UV ray is irradiated thereto. Then, the activated radical is reactive on double bond of the acrylate groups, whereby the acrylate becomes radical. The activated acrylate radical is reactive on double bond of another acrylate, thereby forming high polymer.

In the IPS mode LCD device using the UV-hardening sealant according to the first embodiment of the present invention, when the UV ray is irradiated to the UV-hardening sealant 310 from the side of the second substrate 350 for hardening the UV-hardening sealant 310, the UV ray source passes through the second substrate 350 and is transmitted through the UV-hardening sealant 310, then the UV ray passes through the first substrate 300 after hardening the UV-hardening sealant. Thus, it is necessary to irradiate the UV ray having great energy for hardening the UV-hardening sealant 310 completely.

Accordingly, in order to improve efficiency in hardening the UV-hardening sealant, an IPS mode LCD device and method for manufacturing the same according to the second embodiment of the present invention is proposed as follows. In the IPS mode LCD device according to the second embodiment of the present invention, a metal pattern is formed at a lower side of a UV-hardening sealant. As a result, the UV-hardening sealant is first hardened by the UV ray, and then hardened a second time by the UV ray reflected from the metal pattern.

Figure 9:
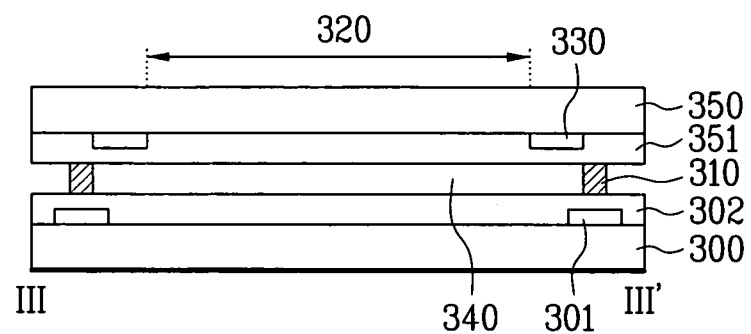
FIG. 9 is a cross-sectional view illustrating an IPS mode LCD device taken along line III-III' of FIG. 7 using a UV-hardening sealant according to the second embodiment of the present invention.

FIG. 9 is a cross-sectional view illustrating an IPS mode LCD device taken along line III-III' of FIG. 7 using a UV-hardening sealant according to the second embodiment of the present invention. Hereinafter, an explanation of a thin film transistor array of an IPS mode formed on a first substrate, and a color filter array on a second substrate will be omitted, and an explanation will be focused on a black matrix layer of a dummy region, a UV-hardening sealant, and a metal pattern.

As shown in FIG. 9, the IPS mode LCD device using the UV-hardening sealant according to the second embodiment of the present invention includes first and second substrates 300 and 350 respectively. The first substrate 300 has a thin film transistor array (not shown) of an IPS mode at an active region 320, and a metal pattern 301 at a dummy region. The second substrate has a color filter array (not shown) of an IPS mode at the active region 320, and a black matrix layer 330 at the dummy region at the circumference of the active region 320. The first and second substrates 300 and 350 are bonded to each other by UV-hardening (UV and thermo hardening) sealant 310.

In this case, the UV-hardening sealant 310 is formed in the circumference of the black matrix layer 330 that is formed in the circumference of the active region 320, so that the black matrix layer 330 does not correspond to the UV-hardening sealant 310. Thus, it is possible to irradiate UV ray to the UV-hardening sealant 310. Also, the metal pattern 301 is formed of the same material as a gate or data line of the IPS mode thin film transistor array, and is formed below the UV-hardening sealant 310 for reflecting the UV ray. In addition, column or fixing spacers (not shown) may be formed on any one of the first and second substrates for maintaining a cell gap between the first and second substrates.

When the UV ray is irradiated to the UV-hardening sealant 310 from the side of the second substrate 350 for hardening the UV-hardening sealant 310, UV ray source passes through the second substrate 350, and is transmitted through the UV-hardening sealant 310, whereby the UV-hardening sealant 310 is first hardened. Then, the UV ray is reflected to the UV-hardening sealant 310 by the metal pattern 301 of the first substrate 300, so that the UV-hardening sealant 310 is hardened a second time, thereby improving efficiency in hardening the UV-hardening sealant 310.

A method for manufacturing the IPS mode LCD device using the UV-hardening sealant according to the second embodiment of the present invention will be described as follows. FIG. 10A to FIG. 10G illustrate manufacturing process steps of an IPS mode LCD device using a UV-hardening sealant according to the second embodiment of the present invention.

Figure 10A:
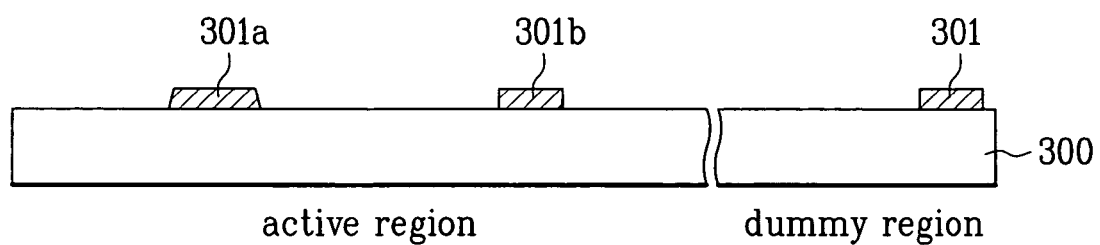
FIG. 10A to FIG. 10G illustrate manufacturing process steps of an IPS mode LCD device using a UV-hardening sealant according to the second embodiment of the present invention.

Referring to FIG. 10A, a plurality of gate lines (not shown) are formed in the active region 320 of the first substrate 300, and then a plurality of gate electrodes 301a are projected from the respective gate lines. Also, a plurality of common lines (not shown) and common electrodes 301b projected from the respective common lines are formed in respective pixel regions, and the metal pattern 301 is formed in the dummy region for reflecting the UV ray. At this time, the gate electrode 301a, the common electrode 301b and the metal pattern 301 are formed of a single-layered structure or a dual-layered structure of Al, Mo, Cr, Al alloy, Ti or Cu. Also, the gate electrode 301a, the common electrode 301b and the metal pattern 301 are formed of the same metal, and the metal pattern 301 corresponds to the UV-hardening sealant 310.

Figure 10B:
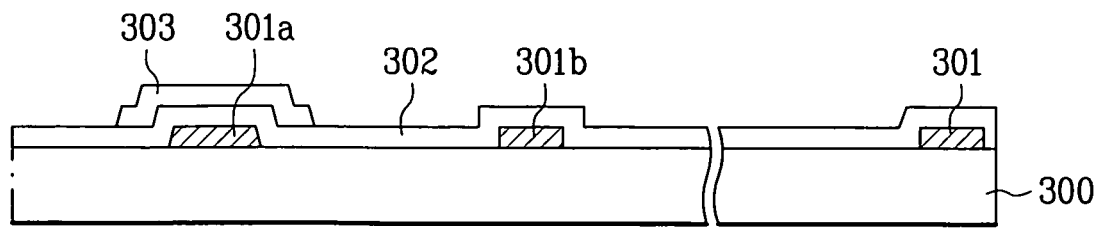

As shown in FIG. 10B, SiNx or SiOx and a-Si/N$^+$ a-Si are deposited on an entire surface of the first substrate 300, and then a patterning process is performed thereto, thereby forming a semiconductor layer 303 having an island-shape on a gate insulating layer 302 above the gate electrode 301a and a predetermined portion of the gate insulating layer 302.

Figure 10C:
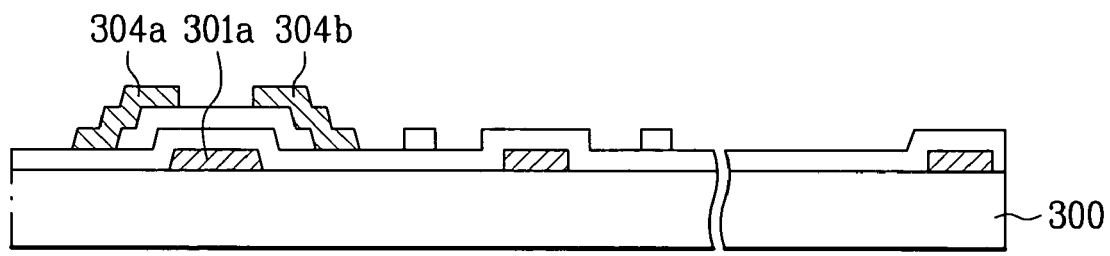

Referring to FIG. 10C, a plurality of data lines (not shown) are formed on the first substrate 300 to be perpendicular to the plurality of gate lines. Then, a source electrode 304a is projected from each data line, and a drain electrode 304b is formed opposite the source electrode 304a. The source and drain electrodes 304a and 304b respectively may have a single-layered structure or a dual-layered structure of metals such as Al, Mo, Cr, Al alloy, Ti and Cu.

Figure 10D:
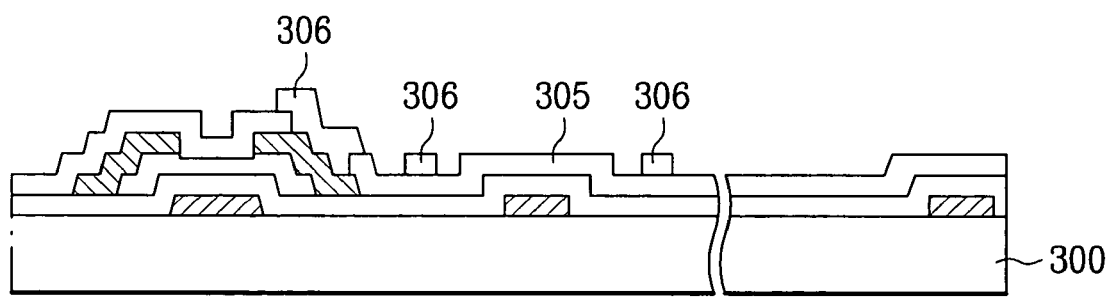

As shown in FIG. 10D, a passivation layer 305 is formed on the entire surface of the substrate to form a contact hole at the drain electrode 304b, and a pixel electrode 306 is formed in the pixel region for being connected to the drain electrode 304b, and being parallel with the common electrode. The pixel electrode 306 is formed of ITO or IZO as well as Al, Mo, Cr or Al alloy, and the passivation layer 305 may be formed of SiNx, SiOx, BCB or acrylic resin.

Figure 10E:
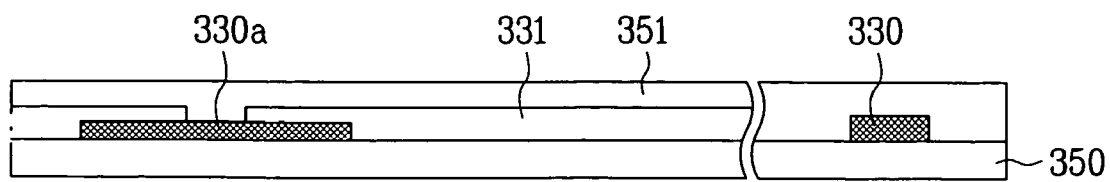

As shown in FIG. 10E, the black matrix layer 330a is formed on the second substrate 350 to exclude light from portions of the active region of the second substrate 350 except the pixel regions. Also, the black matrix layer 330a is formed in the dummy region. The black matrix layer may be formed of Cr, CrOx or black resin. Then, a color filter layer 331 is formed to display colors at the pixel regions of the active region 320, and an overcoat layer 351 is formed on the entire surface of the second substrate 350.

Figure 10F:
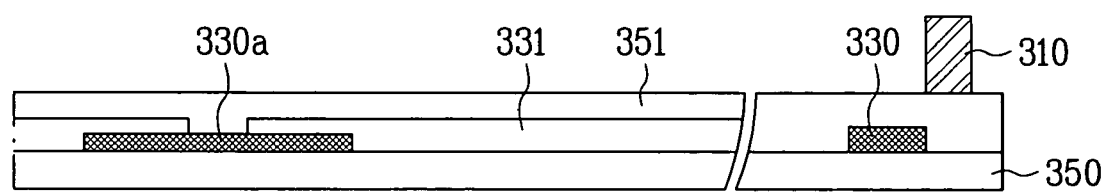

Referring to FIG. 10F, the UV-hardening sealant 310 is formed at the circumference of the black matrix layer 330 of the dummy region. Although not shown, the UV-hardening sealant 310 does not correspond to the black matrix layer 330. Further, the UV-hardening sealant 310 may be formed on the first substrate 300 above the metal pattern 301. Although not shown, liquid crystal is dispensed on the active region of one of the first and second substrates 300 and 350.

Figure 10G:
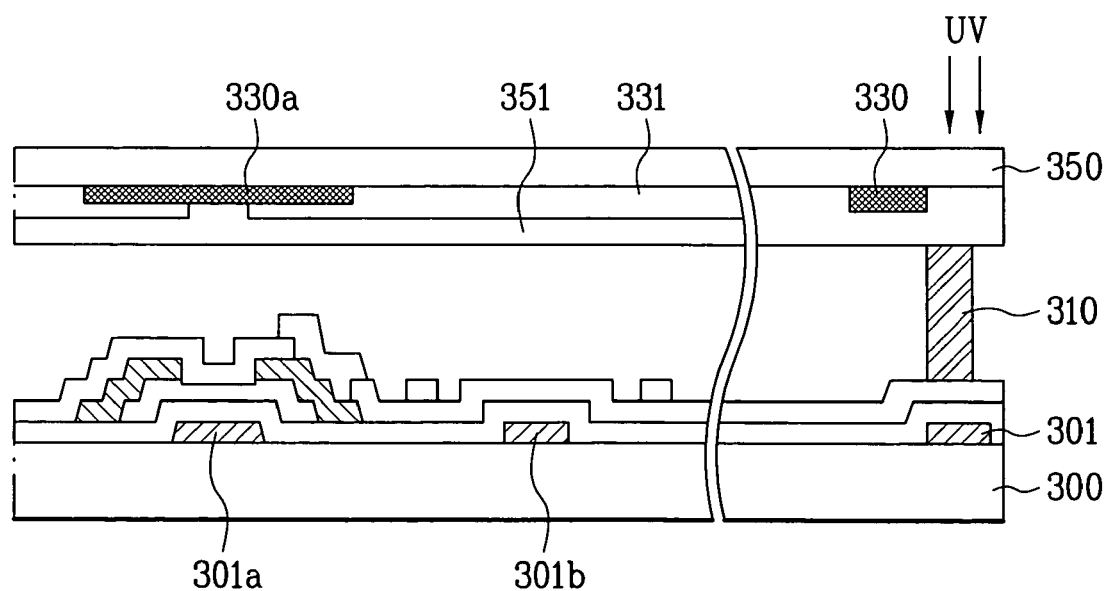

Referring to FIG. 10G, after bonding the first and second substrates, the UV ray is irradiated to the UV-hardening sealant 310. At this time, the UV ray is irradiated from the side of the second substrate 350, so that the UV ray is reflected by the metal pattern 301. In a case in which the UV-hardening sealant 310 includes the thermo hardening sealant, a thermo-hardening process is additionally performed thereto.

As mentioned above, the IPS mode LCD device and method for manufacturing the same has the following advantages.

First, the sealant is formed in the circumference of the black matrix layer of the dummy region, so that it is possible to use the UV-hardening sealant. Also, the liquid crystal dispensing method is used in manufacturing the IPS mode LCD device according to the present invention, thereby decreasing manufacturing time. In addition, the sealant is hardened by the UV ray, whereby the sealant is hardened in a short time, thereby preventing the liquid crystal from being contaminated due to the sealant.

In the IPS mode LCD device according to the present invention, the metal pattern is formed at the portion of the UV-hardening sealant. Thus, when the UV ray is irradiated to harden the UV-hardening sealant, the UV ray source passing through the second substrate is transmitted through the UV-hardening sealant, whereby the UV-hardening sealant is firstly hardened. Then, the UV ray is reflected to the UV-hardening sealant by the metal pattern again, so that the UV-hardening sealant is hardened a second time, thereby improving efficiency in hardening the UV-hardening sealant.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An In-plane switching (IPS) mode LCD device comprising:
   first and second substrates opposite each other, each substrate having an active region and a dummy region;
   gate and data lines substantially perpendicular to each other;
   a pixel electrode and a common electrode in the active region of the first substrate;
   a black matrix layer in the dummy region of the second substrate;
   a UV-hardening sealant at a peripheral area surrounding the black matrix layer between the first and second substrates, wherein the UV-hardening sealant bonds the first and second substrates together;
   a metal pattern between the UV-hardening sealant and the first substrate; and
   a liquid crystal layer between the first and second substrates bonded by the UV-hardening sealant,
   wherein the metal pattern completely overlaps the UV-hardening sealant at opposing sides of the sealant at the peripheral area at two edges of the first substrate.

2. The IPS mode LCD device of claim 1, wherein the metal pattern is of the same material as a gate line.

3. The IPS mode LCD device of claim 1, wherein the UV-hardening sealant includes one of epoxy acrylate resin, urethane acrylate resin and polyester acrylate.

4. The IPS mode LCD of claim 1, further including column spacers for maintaining a cell gap between the first and second substrates, and an overcoat layer.

5. A method for manufacturing an IPS mode LCD device comprising;
   forming gate lines crossing data lines on a first substrate;
   forming a pixel electrode and a common electrode on the first substrate;
   forming a metal pattern in a dummy region of the first substrate having active and dummy regions;
   forming a black matrix layer in a dummy region of a second substrate having active and dummy regions;
   depositing a UV-hardening sealant at a peripheral area of the second substrate surrounding the black matrix layer on the second substrate;
   bonding the first and second substrates to each other after placing the UV-hardening sealant to the first substrate; and
   irradiating a UV ray to harden the UV-hardening sealant;
   wherein the metal pattern completely overlaps the UV-hardening sealant at opposing sides of the sealant at the peripheral area at two edges of the first substrate.

6. The method of claim 5, wherein the UV-hardening sealant includes one of epoxy acrylate resin, urethane acrylate resin and polyester acrylate.

7. The method of claim 5, wherein the metal pattern is formed of the same material as a gate line.

8. The method of claim 5, further comprising dispensing liquid crystal on the active region of the first substrate before bonding the first and second substrates together.

9. The method of claim 5, wherein the UV-hardening sealant is completely hardened with the UV ray reflected from the metal pattern.

* * * * *